United States Patent [19]

Nakamura

[11] Patent Number: 5,080,067

[45] Date of Patent: Jan. 14, 1992

[54] IGNITION TIMING CONTROL DEVICE FOR INTERNAL COMBUSTION ENGINE

[75] Inventor: Kazuhiro Nakamura, Hamamatsu, Japan

[73] Assignee: Sanshin Kogyo Kabushiki Kaisha, Hamamatus, Japan

[21] Appl. No.: 285,774

[22] Filed: Dec. 16, 1988

[30] Foreign Application Priority Data

Dec. 17, 1987 [JP] Japan ................................ 62-317454

[51] Int. Cl.⁵ ............................................. F02D 5/14
[52] U.S. Cl. ..................................... 123/421; 123/424
[58] Field of Search ..................... 123/421, 647, 424

[56] References Cited

U.S. PATENT DOCUMENTS

| | | | |
|---|---|---|---|
| 4,005,688 | 2/1977 | Kawai et al. | 123/421 |
| 4,224,917 | 9/1980 | Nakazawa et al. | 123/647 |
| 4,702,211 | 10/1987 | Kato et al. | 123/421 |
| 4,790,280 | 12/1988 | Umehara et al. | 123/424 |

FOREIGN PATENT DOCUMENTS 0029773  2/1984  Japan ................................. 123/647

Primary Examiner—E. Rollins Cross
Assistant Examiner—Robert E. Mates
Attorney, Agent, or Firm—Ernest A. Beutler

[57] ABSTRACT

A temperature compensated ignition control device wherein the temperature sensor is mounted on the circuit for the spark advance and the complete assembly is mounted in proximity to a portion of the engine for sensing its temperature and advancing the spark during cold starting.

2 Claims, 3 Drawing Sheets

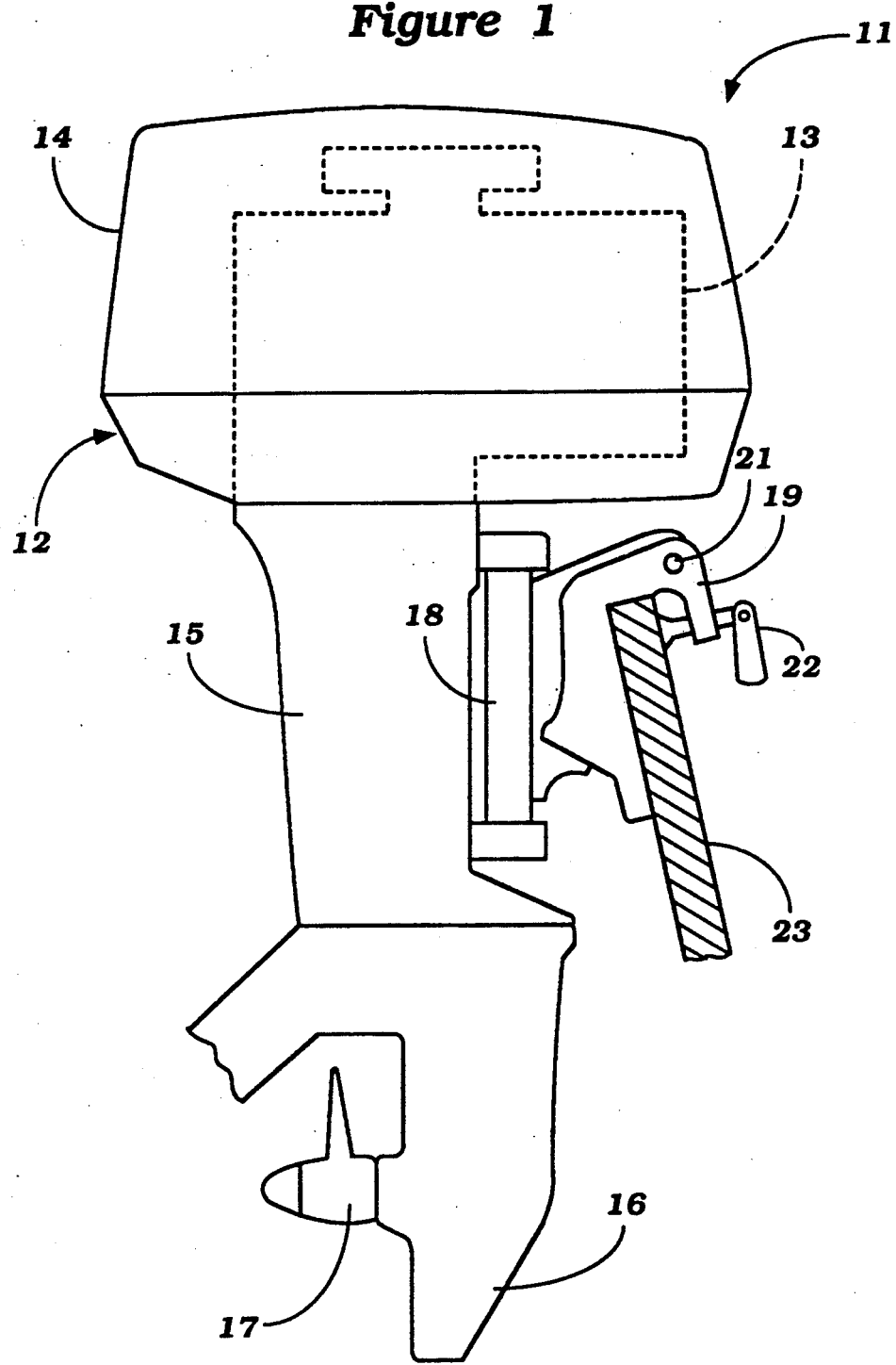

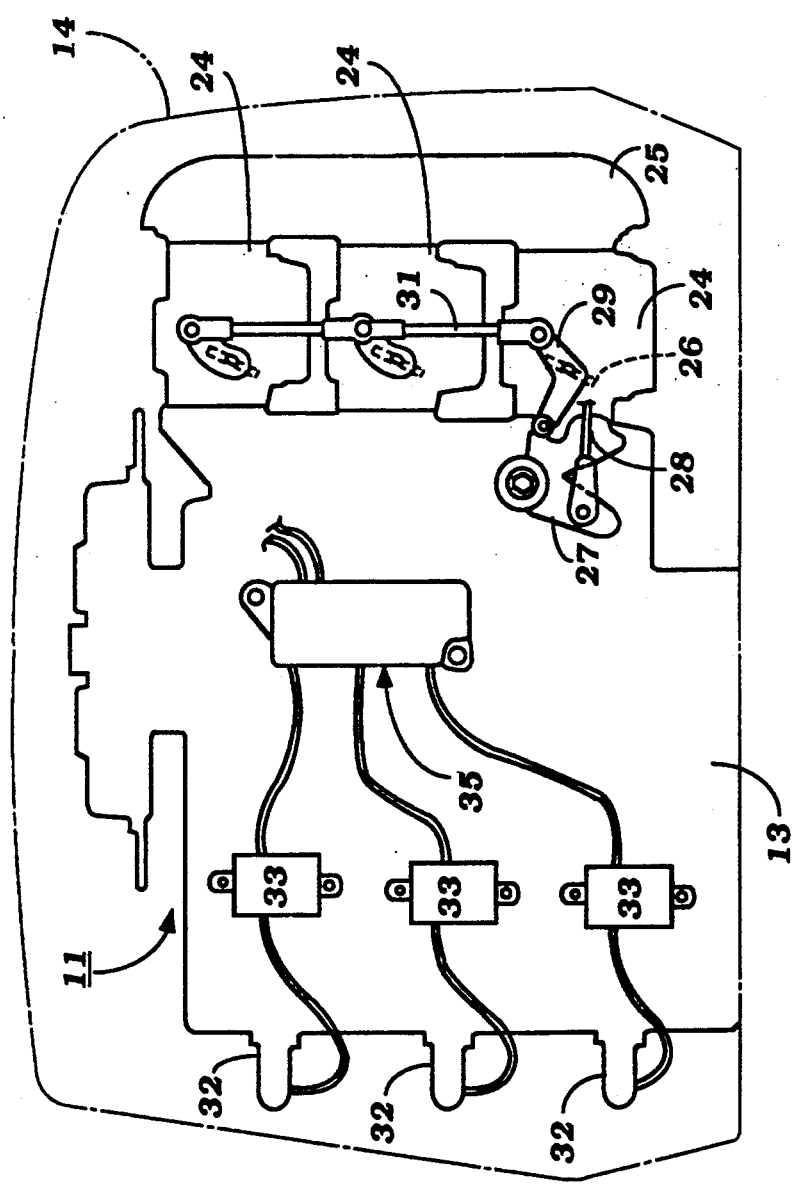
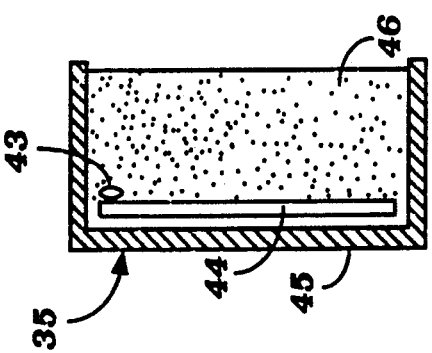

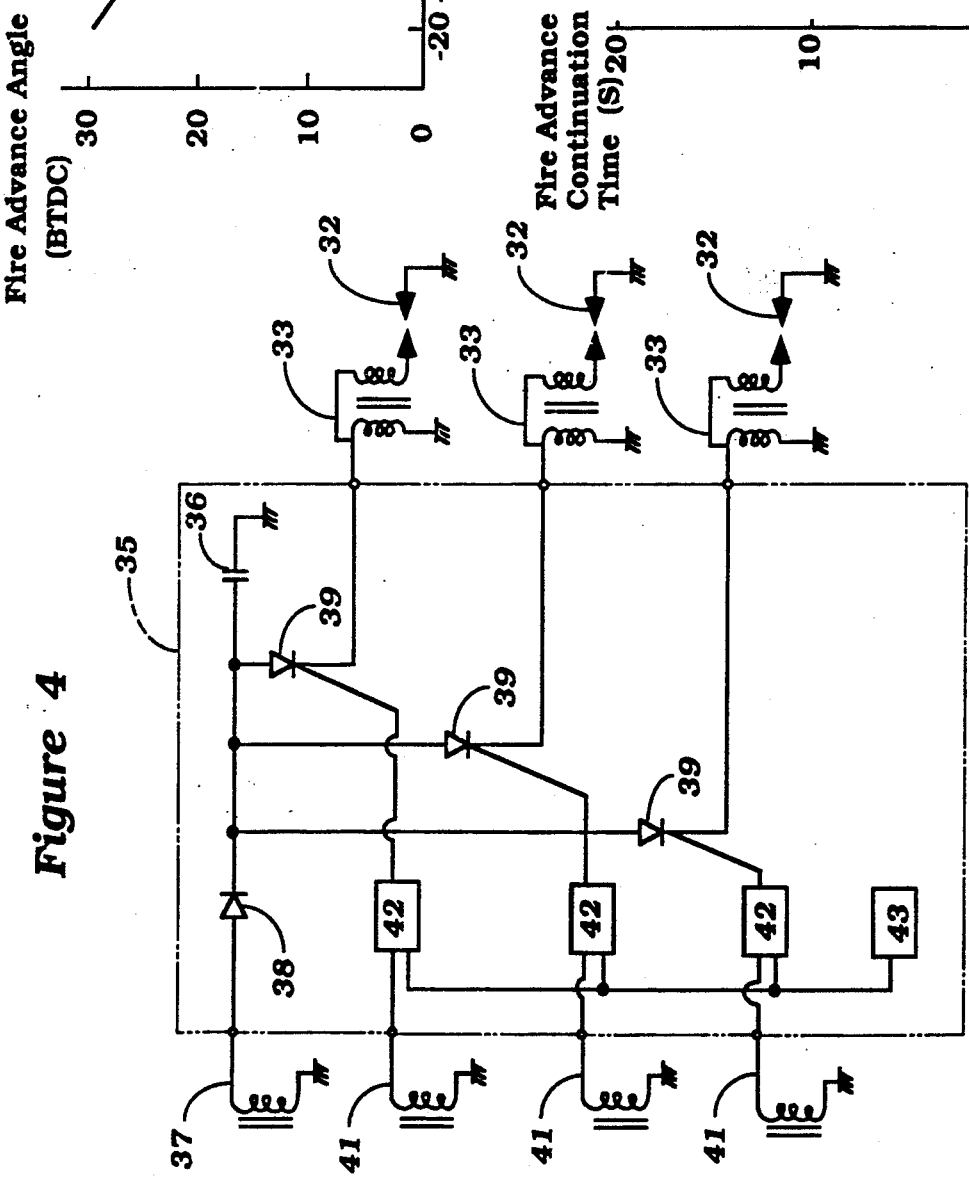

IGNITION TIMING CONTROL DEVICE FOR INTERNAL COMBUSTION ENGINE

BACKGROUND OF THE INVENTION

This invention relates to an ignition timing control device for an internal combustion engine and more particularly to an improved ignition timing control including a temperature responsive advance.

It is well known that a wide variety of internal combustion engines are now provided with electronic ignition control. The use of electronic circuitry permits a wider adjustment of ignition timing to suit a variety of different operating conditions. For example, it has been proposed to employ an engine temperature sensor in combination with the logic of the timing circuitry in order to provide additional spark advance for cold temperature starting. Normally, these devices would include a temperature sensor that is mounted in proximity to the engine so as to sense its temperature. This sensor then outputs a signal to a remotely positioned control circuit including a fire advancing circuit and will achieve an advance in the spark timing under cold starting conditions. Although such systems have advantages, there are some disadvantages with the proposed type of system as described.

For example, when the temperature sensor is remotely positioned from the ignition control circuit, it is necessary to provide a conductor to transmit the signal from the temperature sensor to the spark control circuit. In order to prevent noise and extraneous unwanted signals, it is desirable that the temperature sensor provide a high power output. However, with many engines such as outboard motors, there is not a battery as such and, hence, the temperature sensor cannot output large current signals under cranking operations. Furthermore, the disadvantages of the remote wiring should be readily apparent.

It is, therefore, a principal object of this invention to provide an improved, simplified and relatively compact ignition timing control device including a temperature sensor.

It is a further object of this invention to provide a temperature sensitive ignition timing control that is mounted as a complete unit on the engine.

SUMMARY OF THE INVENTION

This invention is adapted to be embodied in an ignition control device for an internal combustion engine that is comprised of a circuit for controlling the firing of a spark plug of the engine. The circuit includes means for advancing the time of firing in response to a low temperature signal. Means are incorporated for mounting the circuit in proximity to a part of the engine and temperature responsive means for sensing temperature are mounted in proximity to the circuit and supply a signal to the circuit to advance the spark at low temperatures.

BRIEF DESCRIPTION OF THE DRAWINGS

FIG. 1 is a side elevational view of an outboard motor showing the environment of the invention.

FIG. 2 is an enlarged side elevational view of the power head of the outboard motor, with the protective cowling shown in phantom so as to more clearly illustrate the construction.

FIG. 3 is a cross-sectional view taken through the ignition timing control device.

FIG. 4 is an electrical schematic view showing the ignition timing control device.

FIG. 5 is a graphical curve showing the desired spark advance for cranking under various ambient temperatures.

FIG. 6 is a graphical view showing the time of advancing the spark during cranking under various ambient conditions.

DETAILED DESCRIPTION OF THE PREFERRED EMBODIMENT

Referring now in detail to the drawings and initially to FIGS. 1 and 2, an outboard motor constructed in accordance with an embodiment of the invention is identified generally by the reference numeral 11. The outboard motor 11 is comprised of a power head 12 that contains an internal combustion engine 13 which is, in the illustrated embodiment, of the three cylinder, inline, spark ignited, two-cycle type. It is to be understood that the invention can be utilized in conjunction with other types of spark ignited internal combustion engines than inline engines or two-cycle engines.

The power head 12 is completed by means of a protective cowling 14 that surrounds the engine 13.

A drive shaft (not shown) driven by the engine 13 depends into and is journaled within a drive shaft housing 15. This drive shaft continues on into a lower unit 16 and drives a propeller 17 through a known type of forward, neutral, reverse transmission (not shown).

A steering shaft is affixed to the drive shaft housing 15 and is journaled within a swivel bracket 18 for steering of the outboard motor 11 about a generally vertically extending steering axis. The swivel bracket 18 is pivotally connected to a clamping bracket 19 by means of a pivot pin 21 for tilt and trim adjustment of the outboard motor 11. A clamping mechanism 22 is carried by the clamping bracket 19 for affixing the outboard motor 11 to a transom 23 of an associated watercraft.

The construction of the outboard motor 11 as thus far described may be considered to be conventional and since the invention deals with the engine 13 and its ignition system, further description of the outboard motor is not believed to be necessary to understand the construction and operation of the invention.

Referring now primarily to FIG. 2, the engine, as has been noted, is of the three cylinder, inline type and is provided carburetors 24 that supply a mixture of fuel and air drawn from an inlet device 25 to the crankcase chambers of the engine 13 through reed type valves and an intake manifold. The carburetors 24 include throttle valves 26 that are operated by means of a throttle linkage including a control cam 27 that is operated from a remote location by means of a wire actuator 28. The cam 27 operates a follower arm 29 and linkage system 31 for opening or closing the throttle valves 26 in a known manner.

The engine is provided with a spark plug 32 for each of the cylinders. The spark plugs 32 are fired by means of ignition coils 33 which are charged and triggered by means of a spark control circuit indicated generally by the reference numeral 35 and of a type as may be best seen in FIG. 4.

Referring now to FIG. 4, it will be seen that the ignition control device 35 is of the SCR type and includes a charging capacitor 36 that is charged by means of a charging coil 37 of a known type of magneto generator assembly through a rectifying diode 38. Each coil 33 is in circuit with the charging capacitor 37 through a SCR 39. The gate of the SCR 39 is rendered conductive in response to a signal from a respective pulser coil 41 at the appropriate angular position of the engine output shaft so as to permit the discharge of the capacitor 37 through the primary wiring of the respective spark coil 33 so as to fire the respective spark plug 32. There is provided in the circuit between the pulser coil 41 and the gate of the SCR 29 a firing control circuit, indicated schematically at 42. The firing control circuit 42 appropriately adjusts the angle of spark advance in response to engine running characteristics such as speed. In addition, for advancing the spark timing during cold starting, there is provided a temperature responsive device, indicated generally at 43, which is in circuit with the spark control circuits 42 so as to provide a signal which will trigger the spark at an earlier angle depending upon the programming of the circuits 42.

As may be best seen in FIG. 3, the circuit 35 is contained on a printed circuit board 44 that is contained within a housing 45 and is held in place by means of a potting compound 46. The device 35 is mounted on the cylinder block of the engine so that the device 35 and particularly the temperature sensitive device 43 will respond to the actual engine temperature. Because of the fact that the temperature sensitive device 43 is mounted on the circuit 44, it will not be necessary to provide any long conductors nor any remote positioning.

FIG. 5 shows the relationship of temperature to the desired static spark advance angle during cranking for a time period as shown in FIG. 6. The circuit 44 is programmed so as to provide this response in relation to the signals from the temperature sensing device 43. FIG. 6 shows the time period during which the spark should be advanced and the circuit 42 is programmed so as to provide this time of spark advance.

In view of the foregoing, it should be readily apparent that a very compact and highly reliable temperature adjusted spark control is provided. Although an embodiment of the invention has been illustrated and described, various changes and modifications may be made without departing from the spirit and scope of the invention, as defined by the appended claims.

I claim:

1. An electronic ignition control device for an internal combustion engine comprised of a printed circuit board including an SCR and a firing control circuit for controlling the firing of a spark plug of the engine, said firing control circuit including means for advancing the timing of firing in response to a low temperature signal, temperature responsive means for sensing temperature and supplying a signal to said printed circuit board to advance the spark at a low temperature mounted on said printed circuit board and mounted as a unit with said firing control circuit and means for mounting said firing control circuit with said temperature responsive means in proximity to a part of the engine.

2. An ignition control device as set forth in claim 1 wherein the printed circuit board and temperature responsive means are potted and mounted in a housing that is affixed to a side of the engine.

* * * * *